US006856282B2

(12) United States Patent
Mauro et al.

(10) Patent No.: US 6,856,282 B2
(45) Date of Patent: Feb. 15, 2005

(54) DIRECTLY ACQUIRING PRECISION CODE GPS SIGNALS

(75) Inventors: Anthony Mauro, San Diego, CA (US); Norman Krasner, San Carlos, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/283,677

(22) Filed: Oct. 29, 2002

(65) Prior Publication Data

US 2003/0151547 A1 Aug. 14, 2003

Related U.S. Application Data (60) Provisional application No. 60/355,212, filed on Feb. 8, 2002, and provisional application No. 60/362,476, filed on Mar. 6, 2002.

(51) Int. Cl.$^7$ .............................................. H04B 7/185
(52) U.S. Cl. .............................. 342/357.15; 342/357.06
(58) Field of Search ....................... 342/357.02, 357.03, 342/357.06, 357.15; 701/213, 215

(56) References Cited

U.S. PATENT DOCUMENTS

| | | | | |
|---|---|---|---|---|
| 4,445,118 A | * | 4/1984 | Taylor et al. | 342/357.09 |
| 5,615,236 A | | 3/1997 | Turney | 375/365 |
| 5,917,444 A | * | 6/1999 | Loomis et al. | 342/357.12 |
| 6,133,873 A | | 10/2000 | Krasner | 342/357.12 |
| 6,204,808 B1 | * | 3/2001 | Bloebaum et al. | 342/357.07 |
| 6,281,837 B1 | | 8/2001 | Richton et al. | 342/357.1 |
| 6,473,030 B1 | * | 10/2002 | McBurney et al. | 342/357.03 |
| 6,625,458 B2 | * | 9/2003 | Pihl et al. | 455/456.1 |
| 2002/0123352 A1 | * | 9/2002 | Vayanos et al. | 455/456 |
| 2002/0168988 A1 | * | 11/2002 | Younis | 455/456 |

OTHER PUBLICATIONS

Wolfert R et al, "Direct P(Y)–Code Acquisition Under A Jamming Environment", Position Location and Navigation Symposium, IEEE 1998 Palm Springs, CA, Apr. 20–23, 1998, pp. 228–235.

* cited by examiner

*Primary Examiner*—Dao Phan
(74) *Attorney, Agent, or Firm*—Philip Wadsworth; Charles Brown; Richard Bachand (57) ABSTRACT

In general, the invention is directed to techniques for directly acquiring P-codes without first acquiring C/A-codes. For example, in one embodiment, a system comprises an assist server to track a P-code signal from a Global Positioning System (GPS) satellite and generate acquisition assistance information from the signal. The system further comprises a mobile unit to receive the acquisition assistance data from the assist server, and to acquire the P-code signal from the satellite based on the acquisition assistance data. The acquisition assistance data may include time-of-week data indicating an initial time offset into a P-code pseudorandom code sequence for the satellite. The mobile unit may include a reference generator to locally generate a reference pseudorandom code sequence based on the time-of-week data.

71 Claims, 7 Drawing Sheets

FIG. 8

DIRECTLY ACQUIRING PRECISION CODE GPS SIGNALS

RELATED APPLICATIONS

This application claims priority to U.S. Provisional Application Ser. No. 60/355,212, filed on Feb. 8, 2002, and U.S. Provisional Application Ser. No. 60/362,476, filed on Mar. 6, 2002.

BACKGROUND

Technical Field

The invention relates to the Global Positioning System (GPS) and, more particularly, to acquiring GPS signals from satellites.

The Global Positioning System (GPS) is a satellite navigation system designed to provide position, velocity and time information almost anywhere in the world. GPS was developed by the Unites States Department of Defense, and currently includes a constellation of twenty-four operational satellites.

GPS provides two levels of service: a Standard Positioning Service, and a Precise Positioning Service. The Standard Positioning Service (SPS) is a positioning and timing service that is available to all GPS users. SPS makes use of a coarse acquisition pseudorandom code (C/A-code) and a navigation data message. SPS provides a relatively, predictable positioning accuracy of 100 meters (95 percent) horizontally and 156 meters (95 percent) vertically and time transfer accuracy to within 340 nanoseconds (95 percent).

The Precise Positioning Service (PPS) is a highly accurate military positioning, velocity and timing service that is available on a continuous, worldwide basis to authorized users. PPS makes use of a Precision Code (P-code), and is designed primarily for the use of the United States military. P-code capable military user equipment provides a predictable positioning accuracy of at least 22 meters (95 percent) horizontally and 27.7 meters vertically and time transfer accuracy to UTC within 200 nanoseconds (95 percent).

The GPS satellites transmit three pseudorandom noise (PRN) ranging codes on two L-band frequencies: L1=1575.42 MHz and L2=1227.6 MHz, and use. The satellites transmit the C/A-code as a sequence of 1023 pseudorandom binary bi-phase modulations of the GPS L1 carrier signal at a chip rate of 1.023 MHz, producing a code repetition period of one millisecond.

The satellites transmit the P-code as a much longer sequence of pseudo-random binary bi-phase modulations, approximately $10^{14}$ modulations, at a chip rate of 10.23 MHz such that the sequence does not repeat for 267 days. Each GPS satellite transmits a unique one-week segment of the P-code sequence, and resets the sequence each week. A third code, referred to as the Y code, is an encryption sequence that is used in conjunction with the P-code for increased security and anti-spoofing. The P-code and the Y code are available on both L1 and L2 frequencies.

A variety of receivers have been designed to decode the signals transmitted from the satellites for the purposes of determining position, velocity or time. In general, to decipher the GPS signals and compute a final position, the receiver must acquire GPS signals from one or more satellites in view, measure and track the received signals, and recover navigational data from the signals.

The process of searching for and acquiring GPS signals, and computing the location of the receiver can be time consuming. To acquire a GPS signal carrying C/A-codes, for example, a mobile unit typically performs a free-running correlation between the GPS signal with an internally stored C/A-code sequence. Alternatively, the mobile unit may collect a snapshot of the GPS signal over a duration of time to capture the entire sequence, i.e., greater than one millisecond, and calculates a time offset (pseudorange) for the satellite by correlating that buffered signal with the stored C/A-code sequence.

In addition to the code sequences, each satellite transmits a navigation message containing so-called "ephemeris" data, such as its orbital elements, clock behavior, system time and status messages. Upon calculating the pseudoranges for the satellites, a mobile unit extracts the ephemeris data, and calculates a final position based on the calculated pseudoranges for the satellites and the ephemeris data received from the satellites.

Location-assisted acquisition is one technique that has been used within commercial-grade mobile units to accelerate the acquisition process of C/A-codes. According to this approach, the process of acquiring the C/A-codes is distributed between the mobile unit and a network. A location assist server acts as a reference GPS receiver, and continuously operates at a fixed location, such as a cellular base station. When a mobile unit wishes to acquire a C/A-code, the mobile unit communicates with the location server, and requests assistance information including the ephemeris data. The mobile unit makes use of the ephemeris data to accelerate the correlation process for acquiring the C/A-codes. In particular, the mobile unit is able to reduce the number of correlations to be performed, by approximating the time offset based on the ephemeris data received form the assist server.

Acquiring P-codes can be even more computationally intensive than acquiring C/A-codes. For all practical purposes, the P-code sequence is non-repeating. In other words, it is not feasible to buffer the entire P-code sequence, which is reset for a given satellite once a week. For this reason, military grade GPS receivers often make use of the C/A-codes to accelerate acquisition of the P-codes. In other words, the mobile unit first acquires the C/A-codes to extract the ephemeris data from the signals. The device makes use of the ephemeris data extracted using the C/A-codes to accelerate the correlation process for acquiring the P-codes.

Nevertheless, even when acquiring signals utilizing the C/A-code, the process can often require several minutes. In many cases, this lengthy processing time is unacceptable and, furthermore, greatly limits battery life in portable applications. The acquisition process can become even more difficult in weak signal or jamming environments.

SUMMARY

In general, the invention is directed to techniques for directly and efficiently acquiring a P-code signal from a GPS satellite. In other words, acquisition of the P-code signal can be performed without first needing to acquire a C/A-code signal from the satellite.

For example, in one embodiment, a system comprises an assist server to track a signal from a Global Positioning System (GPS) satellite and generate acquisition assistance data from the signal. The system further comprises a mobile unit to receive the acquisition assistance data from the assist server, and to acquire the P-code signal from the satellite based on the acquisition assistance data. The acquisition assistance data may include time-of-week data indicating an initial time offset into a P-code pseudorandom code sequence for the satellite. The mobile unit may include a reference generator to locally generate a reference pseudorandom code sequence based on the time-of-week data. The assist server may track and generate the acquisition assistance data from a C/A-code signal or a P-code signal. The mobile unit and the assist server may be coupled over a wired or wireless communication link.

In another embodiment, a method comprises receiving acquisition assistance data from an assist server, and determining a time offset for a P-code pseudorandom code sequence associated with a signal from a satellite based on the acquisition assistance data.

In another embodiment, an apparatus comprises an antenna to receive a signal from a Global Positioning System (GPS) satellite, and a wireless modem to receive acquisition assistance data from an assist server. The apparatus further comprises a reference generator to generate a reference pseudorandom code sequence based on the acquisition assistance data, and a processor to determine a time offset for a P-code pseudorandom code sequence associated with the signal based on the acquisition assistance data.

In another embodiment, a computer-readable medium comprises instructions for causing a programmable processor to receive acquisition assistance data from an assist server, and determine a time offset for a P-code pseudorandom code sequence associated with a signal from a satellite based on the acquisition assistance data.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
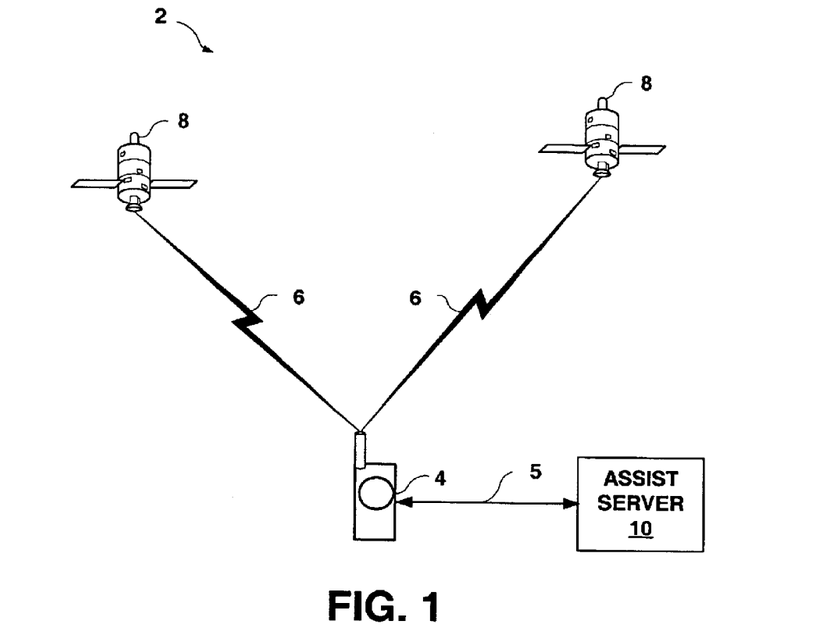
FIG. 1 is a block diagram illustrating an example system in which a mobile unit makes use of assist information to directly acquire P-code GPS signals.

FIG. 1 is a block diagram illustrating an example system 2 in which a mobile unit 4 makes use of acquisition assistance data to directly acquire P-code signals 6 from satellites 8. More specifically, an assist server 10 continuously monitors and tracks GPS signals 6 from satellites 8, and prepares and maintains the acquisition assistance data based on the signals. Assist server 10 may, for example, track a P-code GPS signal or a C/A-code signal, and extract the acquisition assistance data from the signal. The acquisition assistance data may include time-of-week (TOW) information for each of satellites 8. In addition, the acquisition assistance data may further include ephemeris data extracted from the signals 6, such as vehicle (S.V.) identifiers for the satellites 8 that are currently in view, clock behavior, system time, Doppler shifts for each satellite, status messages, and the like.

Assist server 10 communicates the acquisition assistance data to mobile unit 4 that, as described herein, makes use of the acquisition assistance data for directly and efficiently acquiring the P-code signals without first acquiring C/A-code signals. For example, mobile unit 4 makes use of the TOW information to select initial time offsets within the P-code sequence for each of satellites 6. Mobile unit 4 uses the initial time offsets as starting positions within the sequence during the correlation process. In this manner, mobile unit 4 can often significantly reduce the acquisition process, and can acquire the P-code signals from satellites 6 without first acquiring C/A-codes for the satellites.

Upon acquiring the P-code signals, mobile unit 4 computes its position, velocity or other GPS data. Alternatively, mobile unit 4 may communicate pseudorange data to assist server 10. Based on the pseudorange data, plus its knowledge of the current ephemeris data, assist server 10 computes position, velocity, or other GPS data on behalf of mobile unit 4, and communicates the computed GPS data to mobile unit 4.

Mobile unit 4 may take the form of any one of a variety of mobile GPS receivers capable of receiving GPS signals and calculating GPS data. Examples include a handheld GPS receiver, a GPS receiver mounted within a vehicle, such as an airplane, automobile, tank, ship, or the like.

Assist server 10 and mobile unit 4 may communicate using any one of a number of conventional wired or wireless protocols over link 5, which may be a wireless link, a hardware interface, such as a serial or parallel port, an Ethernet connection, or the like. One common wireless communication protocol is code division multiple access (CDMA) in which multiple communications are simultaneously conducted over a radio-frequency (RF) spectrum. Other examples include Global System for Mobile Communications (GSM), which uses narrowband time-division multiple access for communicating data, and General Packet Radio Service (GPRS). In some embodiments, mobile unit 4 may integrate both a GPS receiver and a wireless communication device for voice or data communication.

Assist server 10 may comprise a high-performance GPS receiver having a fixed location. For example, assist server 10 may be coupled to a wireless communication base station for easily communicating with mobile unit 4.

Figure 2:
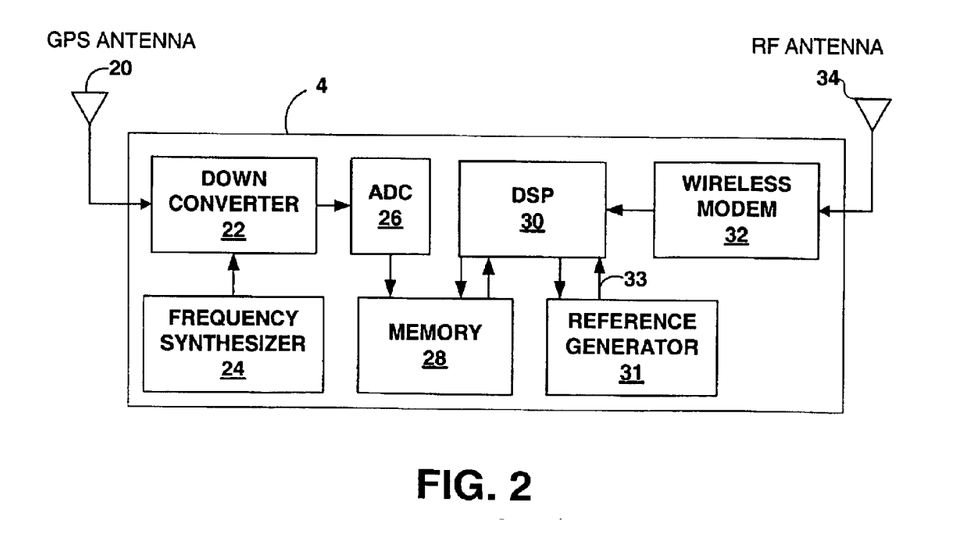
FIG. 2 is a block diagram illustrating an example embodiment of the mobile unit.

FIG. 2 is a block diagram illustrating an example mobile unit 4 in further detail. In general, mobile unit 4 includes a GPS antenna 20, down converter 22, frequency synthesizer 24, analog-to-digital converter (ADC) 26, memory 28, digital signal processor (DSP) 30, and reference generator 31 for receiving and acquiring GPS signals 6. In addition, mobile unit 4 includes wireless modem 32 and RF antenna 34 for communicating with assist server 10.

Down converter 22 receives signals 6 from satellites 8 via GPS antenna 20, and mixes the signals with a signal produced by frequency synthesizer 24 to convert the signals from L-band frequencies to a baseband frequency for processing. Down converter 22 may first convert the signals to an intermediate frequency for conditioning, and then convert the conditioned signal to the baseband frequency.

Alternatively, down converter 22 may implement a zero intermediate frequency (ZIF) architecture for direct conversion of the L-band frequencies to baseband.

ADC 26 samples the baseband signal to produce a digitized representation of the signal, and stores a snapshot of the digitized data in memory 28. For example, memory 28 may store a contiguous set of digitized data, typically corresponding to a duration of 100 ms to 1 second of the baseband signal, or longer, for use by DSP 30 during the acquisition process.

DSP 30 communicates with assist server 10 via wireless modem 32 and RF antenna 34. Although not illustrated in FIG. 2, wireless modem 32 typically includes a down converter and analog-to-digital converter for processing RF signals received from RF antenna 34. Although a common antenna may be used for GPS and cellular communications, a separate antenna may be preferred because the cellular communications and GPS signals typically use different RF bands.

DSP 30 receives acquisition assistance data, including TOW information, from assist server 10 via RF antenna 34, and stores the information for use during the acquisition process. DSP 30 may store the information in memory 28, internal on-chip memory, or other suitable computer-readable media. In addition, DSP 30 typically operates according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. Although described in reference to a digital signal processor, other forms of an embedded processor or controller can be used within mobile unit 4.

DSP 30 communicates the time-of-week (TOW) information received from assist server 10 to reference generator 31, which makes use of the TOW information for generating reference signal 33 for correlation against the GPS signal data stored by memory 28. Reference generator 31 may be realized by digital circuitry, or may take the form of a programmed feature of DSP 30.

Figure 3:
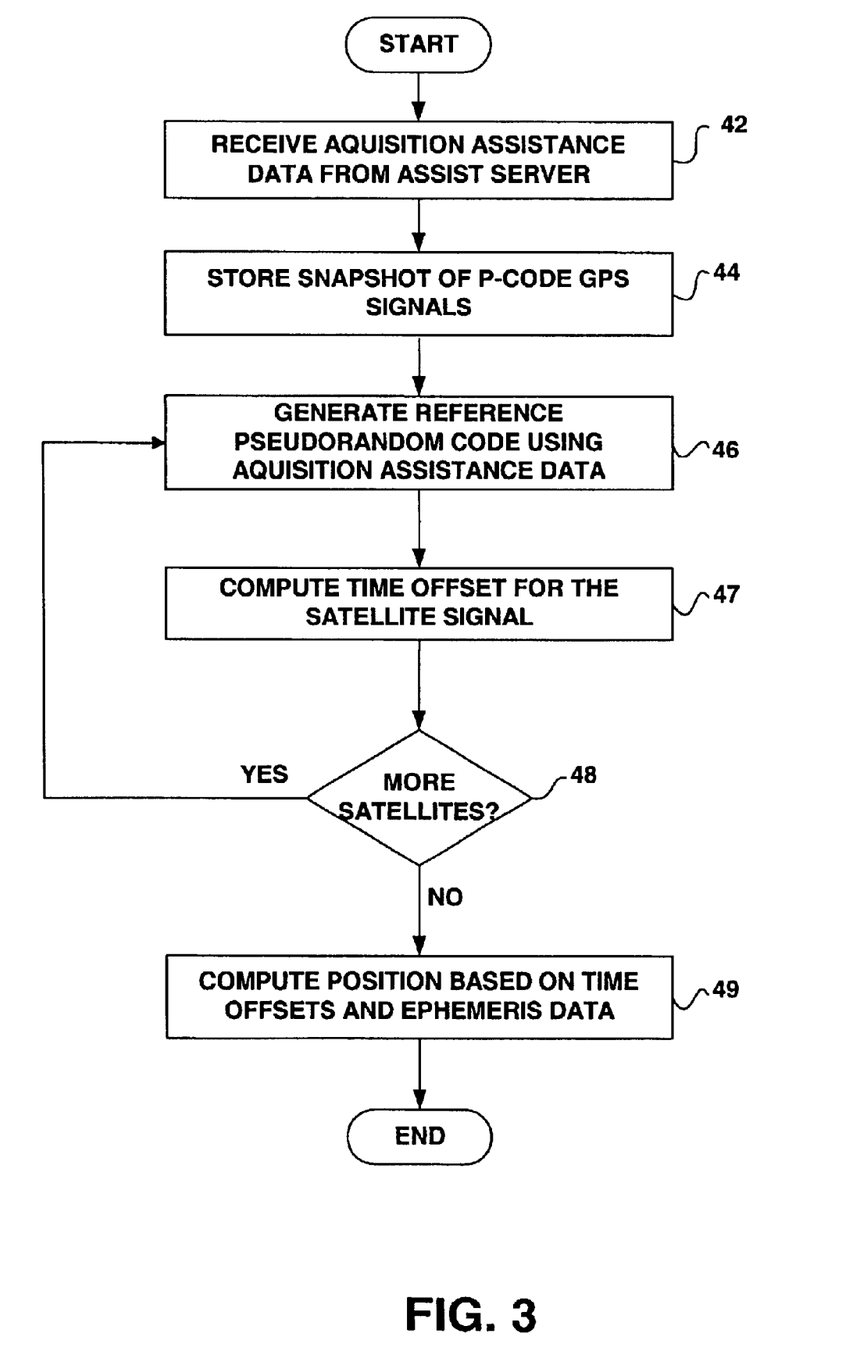
FIG. 3 is a flow chart illustrating an example mode of operation of the mobile unit.

FIG. 3 is a flow chart further illustrating operation of mobile unit 4. To accelerate the acquisition process, mobile unit 4 receives acquisition assistance data from assist server 10 via wireless modem 32 and RF antenna 34 (42). Acquisition assistance data includes TOW information for each of satellites 8, and may include additional ephemeris data, such as vehicle (S.V.) identifiers for the satellites 8 that are currently in view, clock behavior, system time, Doppler shifts for each satellite, status messages, and the like.

To acquire the P-code GPS signals, mobile unit 4 receives the GPS signals from satellites 8, and stores a snapshot of the signals in memory 28 (44). Next, mobile unit 4 acquires each P-code signal using the TOW information for the respective transmitting satellite 8. In particular, reference generator 31 locally generates signal 33 to carry a reference P-code sequence based on the TOW information for the current satellite 8 being acquired (46). In other words, signal 33 may carry a subset of the P-code sequence based on the TOW information for the satellite 8 being acquired. For example, reference generator 31 may select an initial time offset within the P-code sequence based on the TOW information, and may generate a subset of the P-code sequence that progresses from, or surrounds, the initial time offset. Assist server 10 may communicate the TOW information in a time-based format, such as HOURS:MINUTES:SECONDS, or may communicate the TOW information as a chip offset within the P-code sequence.

Unlike conventional systems for acquiring C/A-codes that use a reference sequence of length corresponding to one frame of sequence codes, i.e., 1023 chips of C/A-code, the length of the P-code sequence carried by reference signal 33 may well exceed the amount of data stored within snapshot memory 28. In addition, DSP 30 may adjust the size of the snapshot stored within memory 28 based on sensitivity requirements and an initial time uncertainty value associated with the TOW information received form assist server 10. In some cases, for example, it may be adequate to buffer 100 ms worth of data, but utilize a reference signal 33 that is one second in length or more, where one second represents the uncertainty in the TOW information.

Next, DSP 30 computes a time offset (pseudorange) for the satellite by correlating reference signal 33 with the digitized snapshot of the GPS signals stored within memory 28 (47). As described in detail below, DSP 30 makes use of a Fast Fourier Transform (FFT) algorithm that permits very rapid computation of the pseudoranges by performing a large number of correlation operations between locally generated reference signal 33 and the data stored in memory 28. In particular, the FFT algorithm permits a simultaneous and parallel search of all such positions, thus speeding the required computation process by orders of magnitude over conventional approaches when the number of correlations required is large.

As indicated above, memory 28 captures a digitized data stream corresponding to a relatively long period of time. The efficient processing of this large block of data using fast convolution methods contributes to the ability to process signals 6 at low received levels, e.g., when reception is poor due to partial blockage from buildings, trees, or other obstacles. DSP 30 computes the pseudoranges for visible GPS satellites 8, typically 8 out of the 24 that orbit the earth, using this same buffered data within memory 28. This can provide improved performance relative to conventional continuous tracking GPS receivers in situations, such as urban blockage conditions, in which the signal amplitude is rapidly changing.

Once DSP 30 completes its computation of pseudoranges for each of the satellites 8 in view (48), it computes the position of mobile unit 4 based on the computed pseudoranges for each satellite 8, and ephemeris information provided to mobile unit 4 by assist server 10 (49). Alternatively, DSP 30 may transmit via modem 32 the pseudoranges to assist server 10, which provides a final position computation.

Figure 4:
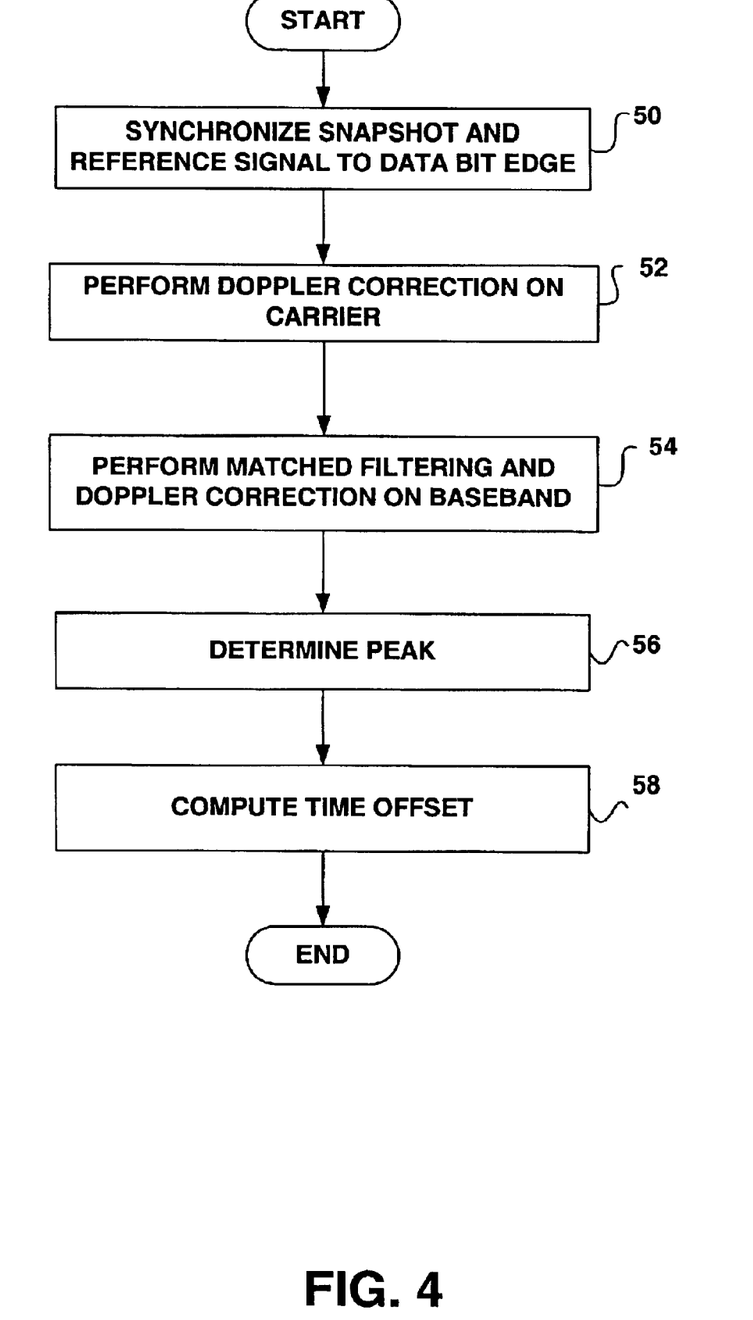
FIG. 4 is a flowchart further illustrating an exemplary process for calculating a pseudorange for a given satellite according to the techniques.

FIG. 4 is a flowchart further illustrating an exemplary process for calculating a pseudorange for a given satellite. Upon acquiring the snapshot of the GPS signals and the acquisition assist information from assist server 10, DSP synchronizes the captured data and the generated reference PN code sequence carried by signal 33 (50). Unlike C/A-code acquisition techniques, in order to directly acquire a P-code GPS signal, DSP 30 may be required to process a range of code phase that exceeds the length of a data bit. Accordingly, unlike conventional GPS receivers that first acquire C/A-codes to acquire P-codes, mobile unit 4 establishes bit synchronization directly from the P-code snapshot stored within memory 28. In other words, because the C/A-code sequence repeats a number of times within a single data bit, conventional GPS receivers need not be concerned with bit edge synchronization for purposes of acquisition. However, one difficulty in directly acquiring the P-code is that the P-code sequence is, for all practical purposes, non-repeating. Accordingly, the bit period for transmitted GPS signals stored within memory 28 repeats a number of times throughout the snapshot, without a repetition of the code phase.

To synchronize the digitized data stored within memory 28 and the code sequence produced by reference generator 31, DSP 30 associates a time uncertainty value with the TOW information received from assist server 10. More specifically, mobile unit 4 associates some time uncertainty, which DSP 30 represents as a time interval, with the TOW information received from assist server 10. The TOW received from assist server 10 may vary from the actual TOW for mobile unit 10 due to a number of factors, such as the communication lag between assist server 10 and mobile unit 4. Furthermore, this may vary for different communication systems. For example, a CDMA system may have an inherent range for the time lag, while other communication systems may have different time lags.

In general, DSP 30 synchronizes the digitized GPS signal and the reference signal 33 based on the received TOW information and the time uncertainty. In particular, DSP 30 first estimates a location for a first bit edge within the digitized data stored within memory 28. The bit edges can be computed using the data transfer of 50 bits per second. Accordingly, a bit edge occurs every 20 ms starting at the beginning of the week. Given a chip rate of 10.23 MHz, bit edges occur every 204600 chips.

Based on the determination and the time uncertainty, DSP 30 disregards a number of chips at the beginning of the digitized data stored within memory 28, and a number of chips at the beginning of the PN code sequence produced by reference generator 31, to start the correlation process at or before the first bit edge. In this manner, DSP 30 uses the TOW information conveyed from assist server 10 and an associated time uncertainty to locally generate a reference P-code sequence, and to synchronize the generated sequence to the data bits stored in memory 28. In this manner, DSP 30 ensures that correct polarity is maintained for the chips throughout an entire bit period during the correlation process.

Figure 5:
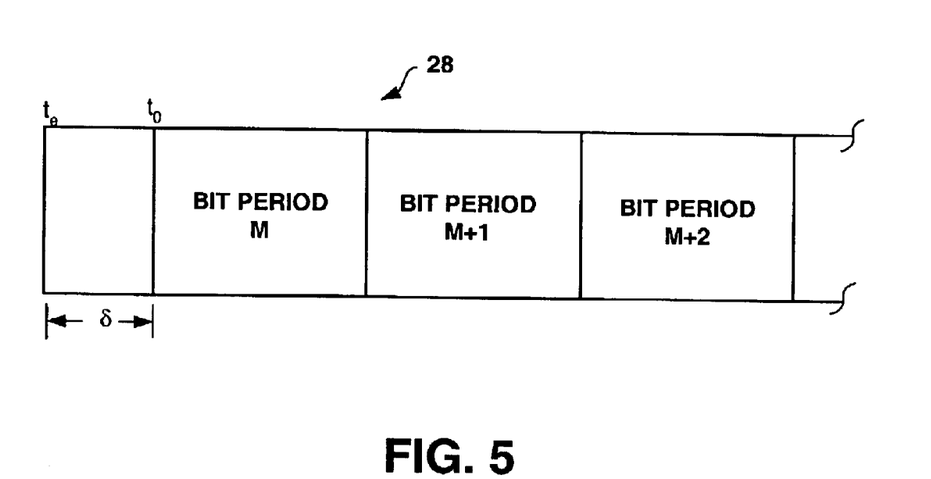
FIG. 5 illustrates an example alignment of the digital data representing a P-code GPS signal.

FIG. 5 illustrates an example alignment of the data snapshot stored by memory 28, assuming that the TOW is between 0 and $\delta$ seconds from a nominal current TOW of $t_e$, and assuming that $\delta$ is relatively small (less than a data bit). In other words, $\delta$ represents the time uncertainty for the TOW received from assist server 10 relative to an actual TOW for the P-code GPS signal received by mobile unit 4.

As illustrated, $t_e+\delta$ represents the code phase at the start of the snapshot, and $t_0$ represents the first bit edge within the snapshot. Assuming a PN sequence beginning at time $t_e+\delta$ has been generated, as in the hypothesis illustrated by FIG. 5, DSP 30 disregards a number of samples at the beginning of the memory 28 and at the beginning of the PN sequence (as just defined) that corresponds to the time from $t_e+\delta$ to $t_0$. An equivalent method is to begin the PN sequence at time $t_0$ (coincident with and defined by the initial bit boundary of m) and create a new buffer by indexing into the original data buffer sequence by a number of samples equivalent to the time period $t_e+\delta-t_0$. These techniques guarantee that the PN sequence always has samples within one data bit.

To process data for lags $t_e+\delta$ to $t_e+2\delta$, the techniques eliminate a number of samples at the beginning of the snapshot and the PN reference equal to the time from $t_e+2\delta$ to $t_0$. Equivalently, DSP 30 may start the PN reference at time $t_0$ and index into memory 28 a number of samples equal to $t_e+2\delta-t_0$. A similar process can be followed to handle the next lag range $t_e+2\delta$ to $t_e+3\delta$, and succeeding ranges of size $\delta$.

Referring again to FIG. 4, after synchronizing the captured data and the generated reference PN code sequence (50), DSP 30 performs Doppler corrections on the carrier by, for example, multiplying by a Doppler carrier correction exponential (52). Next, DSP 30 implements a matched filter using FFT operations. During the process, DSP 30 performs Doppler correction of the baseband signal, e.g., by multiplying by a Doppler carrier correction exponential (54).

In general, the correlation process DSP 30 performs a Doppler search over a number of Doppler hypotheses ("frequency bins") to identify a peak. Assist server 10 may, for example, give a Doppler indication for a satellite as 1000 Hz. Based on the Doppler indication, DSP 30 assigns a frequency increment, e.g., 50 Hz, that effectively establishes a number of frequency bins around the carrier frequency. DSP 30 performs correlation operations for the frequency bins until a peak is detected.

For each bin, DSP 30 divides the reference signal 33 and snapshot data within memory 28 into L blocks, where the max block size is less than the data bit period (204600 P-code chips) plus the estimated time uncertainty for the received TOW relative to the actual TOW for the P-code GPS signal. DSP 30 applies a matched filtering operation to each of the blocks with the purpose of determining the relative timing between snapshot data contained within memory 28 and the PN code sequence carried by reference signal 33. Simultaneously, DSP 30 can compensate for the effect of Doppler shift on the sampling times. DSP 30 can greatly reduce the computation time of these operations by the use of fast convolution operations using FFT algorithms as presently described.

For each block, DSP30 computes the FFT of the snapshot data, and the FFT of reference signal 33. DSP 30 multiplies the snapshot with the complex conjugate of the reference, after Doppler correction. The result will have a correlation peak at a time offset equal to the relative delay of the GPS signal, assuming it occurs at a lag corresponding to the two sequences. DSP 30 computes a magnitude of the data for the set of correlation lags, and sums the magnitudes over a number of integration blocks, also termed number of post detection sums.

Figure 6:
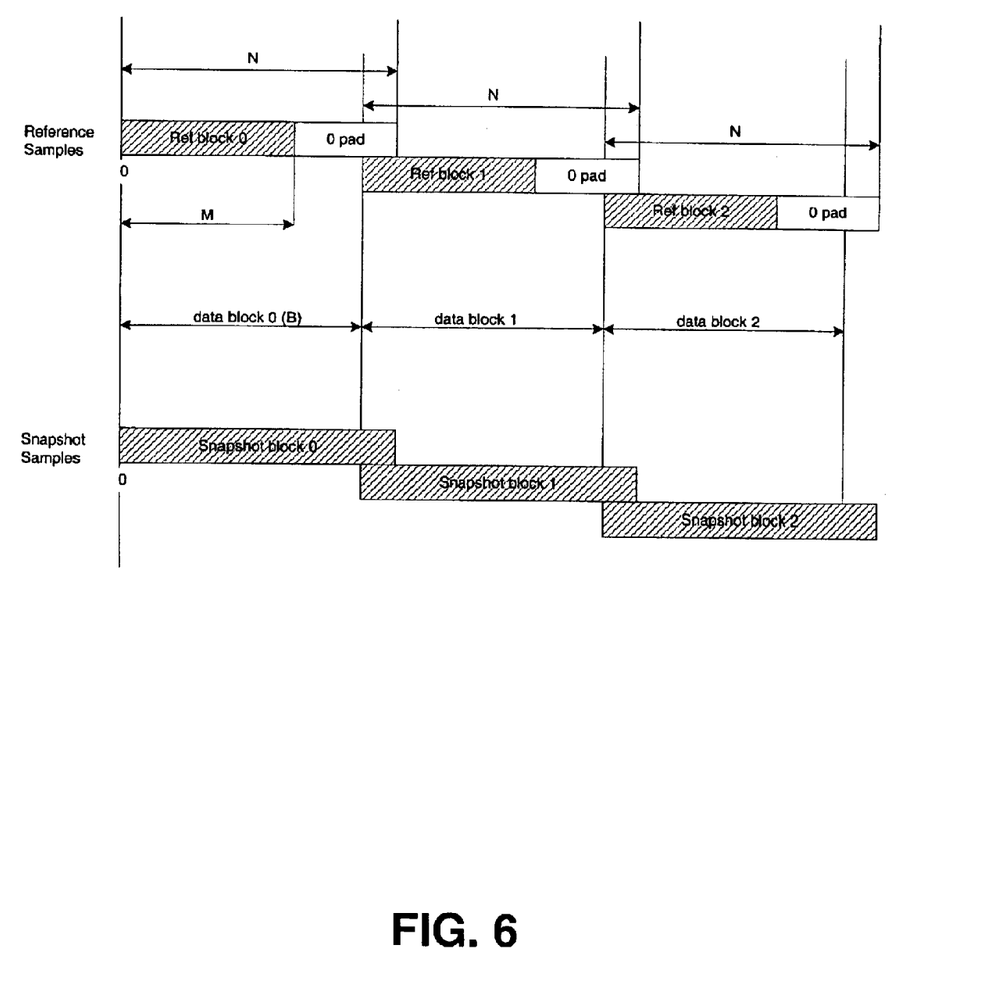
FIG. 6 is a timing diagram illustrating an example correlation operation performed by the mobile unit that makes use of an overlap-save method based upon a time uncertainty value.

As illustrated in FIG. 6 DSP 30 performs the FFT by convolving data blocks of length N, where N is the length of the snapshot data stored in memory 28 as set by DSP 30 based on the time uncertainty value associated with the TOW information received from assist server 10. DSP 30 zero pads the blocks of the reference signal with N–M zeros, where M represents the bit period. In this manner, the length of the zero padding of the reference blocks is a function of the time uncertainty associated with the TOW.

In addition, DSP 30 adds data beyond each bit boundary to the prior block in an overlap-save method, as illustrated in FIG. 6, where M equals the number of non-zero reference P-code chips, N equals the FFT size, typically $2^{18}=262144$ chips, and B equals the data bit size, 204600 P-code chips. As described below, normally $M \leq B$.

For example, if R(0) is the value of the PN code corresponding to time $t_0$ and D(0) is the first data word in memory 28, as aligned to a first bit edge as explained above, DSP 30 performs the following procedure:

Convolve the first block of data:
 Ref Block 0=[R(0,1,2, . . . ,M–1) Zeros(1,N–M)],
  where M<N Data Block 0=D(0,1,2, . . . ,N−1).

To improve sensitivity, DSP 30 performs the convolution on the next L (overlapped) blocks of data, computes the magnitude, and sums the magnitudes with the preceding blocks:

Ref Block 1=[R(B+[0,1,2, . . . ,M−1]) Zeros(1,N−M)]

Data Block 1=D(B+[0,1,2, . . . ,N−1])

. . .

Continue for L blocks.

Ref Block L−1=[R(j×B+[0,1,2, . . . ,M−1]) Zeros(1,N−M)]

Data Block L−1=D(j×B+[0,1,2, . . . ,N−1]), where j=2,3, . . . L−1

The output data is of size N, but due to the nature of the overlap-save convolution, only the first N−M samples (or "lags") contain no alias terms resulting from the circular convolution. Normally, DSP 30 only retains these terms. Additional lags may be ascertained by repeating the overall procedure while offsetting the relative timing of the reference and data sequences.

Note that some processing may be lost because only $M/10.23 \times 10^6$ s out of 20 ms are processed. This is due to the M nonzero samples of the reference that correspond to the first M samples of each data bit (total data bit size 204600). The result may be a sensitivity loss of about 10 log(M/204600) dB relative to the situation in which an entire data bit at a time is processed.

This loss can be overcome in a couple of ways. Extra energy can be gained if two convolutions are performed (instead of one convolution for each of the steps above) and then the results added prior to forming a magnitude-squared operation. The second convolution can make use of altered reference and data blocks. The processing of the first sets of reference and data blocks can begin with a decision of M reference samples and N data samples at the left, as shown in FIG. 6, and referred to herein as convolution 0A. Convolution 0B eliminates the above loss, and utilize reference data beginning at the end of the shaded period of Bit Period 0, and concludes at the end of Bit Period 0.

In other words, data samples M through 204600, for a total of B−M samples (B=204600), would be padded with N+M−B zero-valued samples to yield N total reference samples. The data block would utilize buffered data beginning at time M and consist of N total samples. The result of convolution 0B is then added to that of 0A. The result provides a full convolution utilizing the entire data bit duration of 204600 samples. Again, note that typically only the first N−M samples are retained of this convolution to avoid time-aliasing distortion.

A possibly more efficient approach is to utilize FFT sizes of 204600. In this technique, the shaded periods M would be identical to the bit period B. This approach eliminates the necessity to perform two convolutions to process all data within a bit period. However, implementing this non-standard size might be more complex than performing a radix-2 FFT.

Yet another approach would be to sample the data at a lower rate so that M data samples equals one bit period. However, this may result in some loss in sensitivity due to the reduced bandwidth. Alternatively, for sizes that are equal to one data bit, data could be sampled at twice this rate and then perform FFTs. However, this approach may require increased computation time and memory capacity.

Referring again to FIG. 4, after applying the matched filter operation DSP 30 performs peak detection (56) to determine the time offset for the satellite being acquired (58). In particular, DSP 30 computes magnitudes of the M samples extracted from the FFT techniques, and adds the magnitudes in a running buffer. DSP 30 continues this process a number of times equal to the number of post detection sums. Note that the FFT produces N output samples, but the processing gain is actually a function of M due to the reference block zero padding. DSP 30 then computes the mean of the running buffer, and subtracts from the buffer itself. Next, DSP 30 computes the RMS noise, and a threshold set in the running buffer equal to k times the RMS. DSP 30 may choose the threshold to avoid situations in which noise spikes may cause a threshold crossing, often called a "false alarm."

Figure 7:
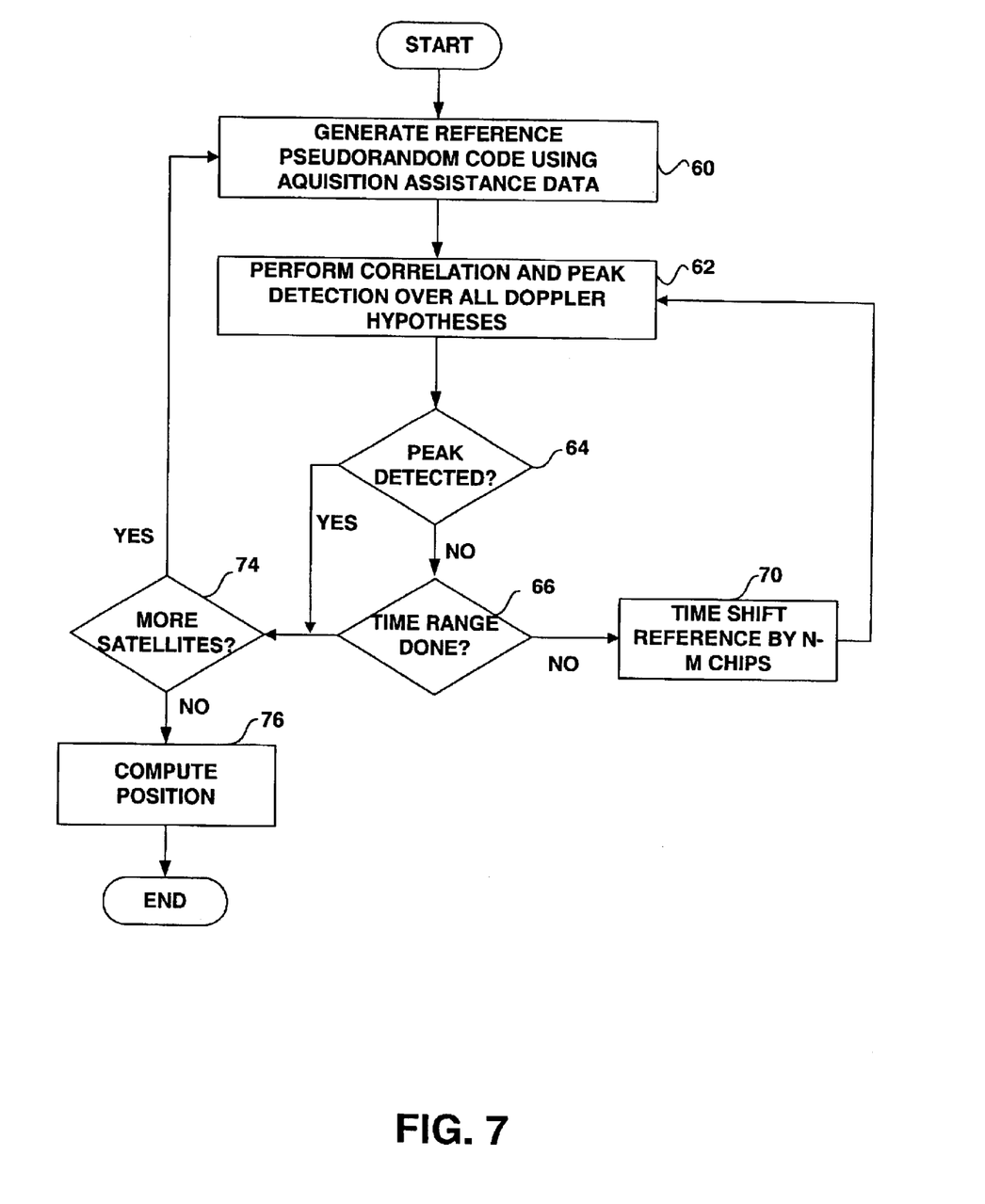
FIG. 7 is a flowchart illustrating an example acquisition process when the time uncertainty value is relatively large.

FIG. 7 is a flowchart illustrating an example acquisition process when the time uncertainty value associated with the TOW received from assist server 10 is relatively large, i.e., when the time uncertainty exceeds a data bit period M. As described above, reference generator 31 locally generates a signal 33 containing a reference pseudorandom code using acquisition assistance data (60), and performs peak detection by correlating reference signal 33 with the digitized snapshot of the GPS signals (62). As described above, for each satellite, DSP 30 performs a Doppler search over a number of Doppler "bins" to identify a peak. Assist server 10 may, for example, give a Doppler indication for a satellite as 1000 Hz. Based on the Doppler, DSP 30 assigns a frequency increment, e.g., 50 Hz, that effectively establishes a number of frequency bins around the carrier frequency.

If a peak is not detected over all Doppler hypotheses (64), DSP 30 performs an additional search by "sliding" the reference P-code relative to the stored snaps shot data by N−M chips, where N represents the block size and M represents the bit period (70). After sliding the reference P-code, DSP 30 repeats the set of convolution operations to determine is a peak can be found within any of the bins (62). If no peak is detected over all Doppler hypotheses, the reference P-code is shifted until the time uncertainty range is exhausted (66). Note, for each sliding of the reference P-code, DSP 30 resynchronizes the snapshot to the next data bit boundary as described above. DSP 30 continues the process until all satellites are searched (74), and a final position is computed (76).

Figure 8:
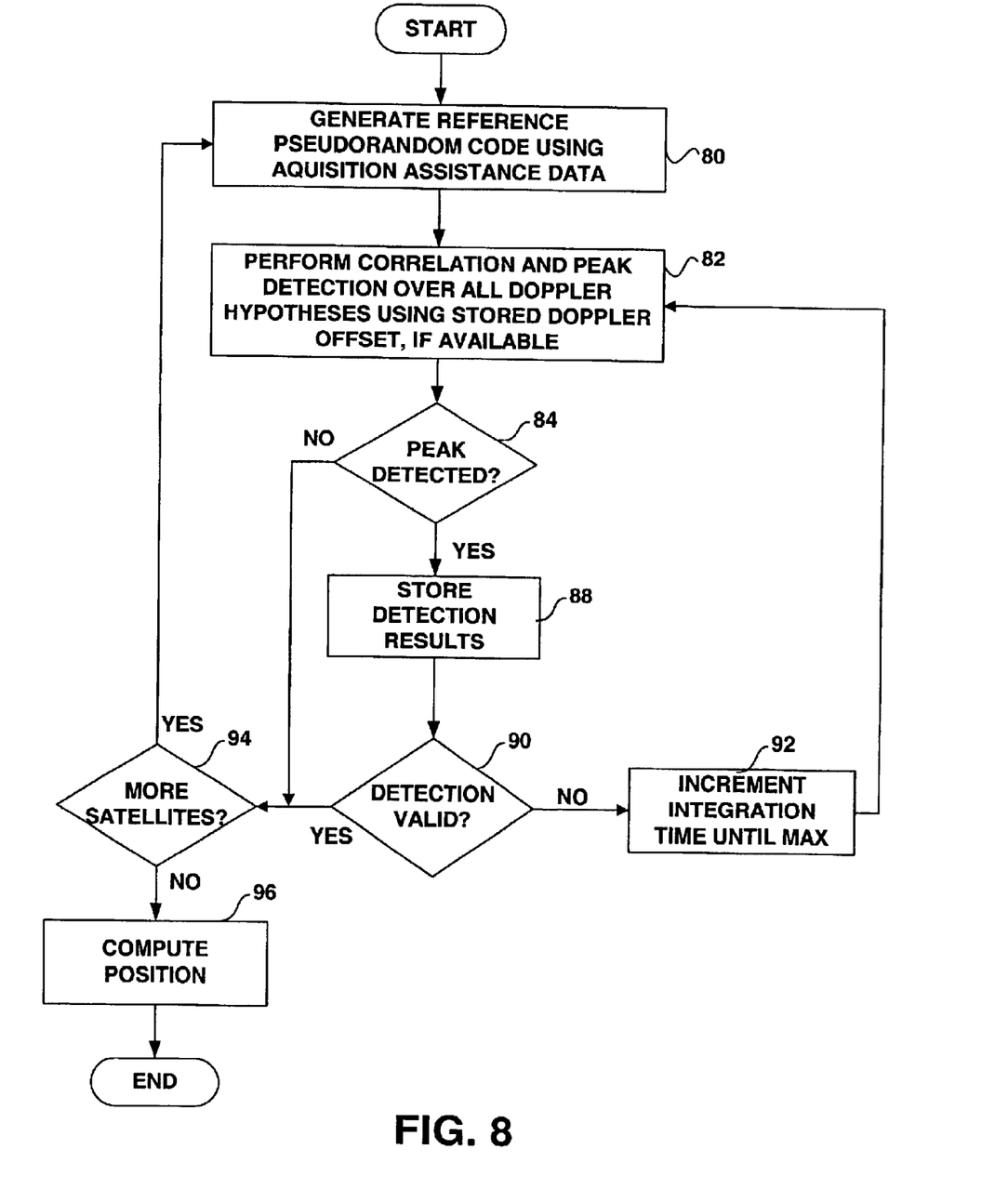
FIG. 8 is a flowchart illustrating an adaptive acquisition process for acquiring multiple satellites.

FIG. 8 is a flowchart illustrating an adaptive acquisition process for acquiring multiple satellites. As described above, reference generator 31 locally generates signal 33 (80), and performs peak detection by correlating reference signal 33 with the digitized snapshot of the GPS signals (82).

As described above, for each satellite, DSP 30 performs a Doppler search over a number of Doppler "bins" to identify a peak. To reduce the number of bins searched, DSP 30 first searches for one of the satellites, such as a satellite indicated by assist server 10 as being relatively overhead, using a relatively short integration time. For this satellite and integration time, DSP 30 performs a search for each of a set of Doppler bins as described above. For example, DSP 30 may begin the search at a middle bin, and proceed outward until all bins have been exhausted (e.g. bin frequency offset 0, offset −50 Hz, offset +50 Hz, offset −100 Hz, offset +100 Hz, etc.). Each search would produce a set of outputs from the FFT-based matched filter operation. If any output exceeds a detection threshold (84), DSP 30 declares a preliminary detection and stores the detection results, such as the current Doppler offset, time offset, and the like (88). When a detection is determined, DSP 30 determines whether the detection is valid by examining measurements for neighboring Doppler offsets to determine if detections were found for these offsets, and if the signal strength for current Doppler was maximum relative to its neighbors (90). If such a maximum is found, and if the measurement of output signal-to-noise ratio (SNR) is sufficiently high to yield good measurement of pseudorange, e.g., the SNR is above a threshold, then DSP 30 terminates processing of the given satellite.

If no detections are found (no branch of 90), then DSP 30 uses a longer integration time for the given satellite and repeats the process until a peak is detected or until a maximum integration time is reached (92).

Once a satellite is acquired, DSP 30 makes use of the actual Doppler information for the satellite to narrow the search space for the subsequent satellites. In particular, upon acquiring a satellite, DSP 30 uses the Doppler offset of the acquired satellite as an initial frequency offset. This takes advantage of the fact that certain sources of error, such as local oscillator drift, may be common to the processing of the multiplicity of satellite signals. The second satellite's signal is then searched in a manner similar to that of the first and if detection is made with suitable output SNR, then the processing of this satellite terminates. If detections are made for multiple satellites, an average, or weighted average (weighted by SNR) of their Doppler offsets may be used to initialize the Doppler search corresponding to the other satellites. DSP 30 continues the process until all satellites are searched (94), and a final position is computed (96).

As an example, if the initial search time was 50 ms and the identified Doppler offset for the satellite was zero, then DSP may have achieved this result by only searching three Dopplers hypotheses (bins), i.e., the current bin and two neighboring bins. Comparing this result with a search using a one second integration time and nine Dopplers, then a search time reduction results equaling 1 second/50 ms×9 bins/3 bins, which equals a sixty-to-one reduction in the number of computations. Furthermore, even for the weaker satellite signals, correct initialization of Doppler offset could result in substantial savings in processing time.

As a variation, DSP 30 may search for a given integration time across all Dopplers and all satellites before increasing the integration time. This might be advantageous when there is no a priori knowledge of which satellite signals are preferable, e.g., signals corresponding to satellites higher in the sky. Alternatively, once a detection was made for a given combination of satellite, Doppler and integration time, this integration time might be increased for the given satellite and Doppler until the SNR exceeds a threshold that indicates adequate pseudorange accuracy. DSP 30 may then similarly analyze the neighboring Dopplers for the satellite by varying their integration times. This approach may be advantages in that increasing integration time can be done without requiring additional storage and without loss of previously processed data.

Various embodiments of the invention have been described. These and other embodiments are within the scope of the following claims.

What is claimed is:

1. A method comprising:
   receiving acquisition assistance data from an assist server; and
   determining a time offset for a P-code pseudorandom code sequence associated with a signal from a satellite based on the acquisition assistance data.

2. The method of claim 1, further comprising determining a position for a mobile unit based on the time offset.

3. The method of claim 1, wherein the acquisition assistance data includes time-of-week data indicating an initial time offset into the P-code sequence.

4. The method of claim 3, wherein determining a time offset comprises locally generating a reference pseudorandom code sequence based on the time-of-week information received from the assist server.

5. The method of claim 4, wherein generating a reference pseudorandom code sequence comprises generating the reference pseudorandom code sequence to include contiguous pseudorandom codes within the P-code sequence starting at the initial time offset.

6. The method of claim 4, further comprising:
   digitizing the signal to produce a stream of digital data;
   buffering an amount of the digital data; and
   correlating the buffered digital data with the locally generated reference code sequence.

7. The method of claim 6, further comprising setting the amount of buffered digital data based on a time uncertainty value associated with the time-of-week information received from the assist server.

8. The method of claim 7, wherein the uncertainty value comprises a predefined uncertainty value.

9. The method of claim 6, wherein correlating the buffered digital data with the locally generated reference code sequence comprises synchronizing the digital data and the reference pseudorandom code sequence.

10. The method of claim 9, wherein synchronizing the digital data and the reference pseudorandom code sequence comprises:
    estimating a first bit edge within the digital data stored within memory; and
    disregarding a number of chips within the digital data and a number of chips within the reference pseudorandom code sequence based on the estimated first bit edge and a time uncertainty value associated with the time-of-week information received from the assist server.

11. The method of claim 6, wherein correlating the buffered digital data with the locally generated reference code sequence comprises dividing the reference code sequence and digital data into blocks of size N, where the block size N is less than a data bit period M associated with the signal plus a time uncertainty value associated with the received time-of-week information.

12. The method of claim 6, wherein dividing the reference code sequence and the digital data into blocks include forming blocks from the reference code sequence to have M chips and N−M padded zeros.

13. The method of claim 6, wherein correlating the buffered digital data with the locally generated reference code sequence comprises applying a matched filtering operation to each of the blocks to produce a correlation peak having a time offset relative to the reference code sequence.

14. The method of claim 13, further comprising:
    sliding the reference code relative to the digital data of the signal by N−M chips, where N represents the block size and M represents the bit period, when the correlation peak is below a peak threshold; and
    repeating the matched filter operations.

15. The method of claim 13, wherein sliding the reference code relative to the digital data comprises repeatedly sliding the reference code and performing the correlation process until a total number of shifted chips for the reference code exceed a time uncertainty value associated with the time-of-week information received from the assist server.

16. The method of claim 1, further comprising:
    performing a Doppler search over a number of Doppler hypotheses to identify a Doppler offset for the signal; and using the Doppler offset as an initial frequency offset for acquiring signals from subsequent satellites.

17. The method of claim 16, further comprising:

using a first integration time, performing the Doppler search for each of a set of Doppler bins to produce a set of outputs; and increasing the integration time and repeating the process when no valid peak is detected based on the set of outputs.

18. The method of claim 17, further comprising:

declaring a preliminary detection when any of the outputs exceed a detection threshold;

storing a current Doppler offset associated with the preliminary detection; and validating the preliminary detection by examining the outputs for neighboring Doppler bins of the current Doppler bin.

19. The method of claim 18, wherein validating the preliminary detection comprises examining the outputs for the neighboring Doppler offsets to determine whether a signal strength for the current Doppler offset is maximum relative to the neighboring Doppler offsets.

20. The method of claim 1, wherein the acquisition assistance data comprises identification for satellites in view from a mobile unit, time-of-week data for the satellites Doppler information for the satellites, frequency synchronization information, and position information for the satellites.

21. The method of claim 1, further comprising:

communicating the time offset to the assist server; and receiving position data from the assists server.

22. The method of claim 1, further comprising calculating a position based on the time offset.

23. A method comprising:

receiving acquisition assistance data from an assist server, wherein the acquisition assistance data identifies a set of satellites and includes time-of-week data indicating an initial time offset into a P-code pseudorandom code sequence for each of the satellites;

receiving signals from the satellites;

digitizing the signals to produce a stream of digital data;

buffering an amount of the digital data;

locally generating reference P-code pseudorandom code sequences for the satellites based on the respective initial time offsets for the satellites;

correlating the digital data with the reference code sequences to identify correlation peaks having respective time offsets; and determining a position for a mobile unit based on the time offsets.

24. The method of claim 23, wherein correlating the digital data with the locally generated reference code sequences comprises:

estimating a first bit edge within the digital data stored within memory; and disregarding a number of chips within the digital data and a number of chips within each of the reference pseudorandom code sequences based on the estimated first bit edge and a time uncertainty value associated with the time-of-week information received from the assist server.

25. The method of claim 22, wherein correlating the buffered digital data with the locally generated reference code sequences comprises dividing the reference code sequences and digital data into blocks of size N, where the block size N is less than a data bit period M associated with the signal plus a time uncertainty value associated with the received time-of-week information, and wherein the blocks of the reference code sequence have M chips and N−M padded zeros.

26. The method of claim 23, wherein correlating the buffered digital data with the locally generated reference code sequences comprises performing a matched filtering operation to each of the blocks to produce a correlation peak having a time offset relative to the reference code sequence.

27. The method of claim 26, further comprising:

sliding the reference code for a given satellite relative to the digital data of the signal by N−M chips, where N represents the block size and M represents the bit period, when the correlation peak for a given satellite is below a peak threshold; and repeating the matched filtering operations for the given satellite.

28. The method of claim 27, wherein sliding the reference code relative to the digital data comprises repeatedly sliding the reference code and performing the matched filtering operations until a total number of shifted chips for the reference code exceed a time uncertainty value associated with the time-of-week information received from the assist server.

29. The method of claim 23, further comprising:

using a first integration time, performing the Doppler search for each of a set of Doppler hypotheses to produce a set of outputs for a first one the signals; and declaring a preliminary detection when any of the outputs exceed a detection threshold;

storing a current Doppler offset associated with the preliminary detection;

validating the preliminary detection by examining the outputs for the neighboring Doppler offsets to determine whether a signal strength for the current Doppler offset is maximum relative to the neighboring Doppler offsets; and using the Doppler offset as an initial frequency offset for acquiring signals from subsequent satellites.

30. The method of claim 1, further comprising:

communicating the time offset to the server; and receiving position data from the server.

31. The method of claim 23, further comprising:

performing a Doppler search over a number of Doppler hypotheses to identify a Doppler offset for a first one of the signals; and using the Doppler offset as an initial frequency offset for performing a Doppler search for at least one of the other satellites.

32. A method comprising:

receiving acquisition assistance data from server; and directly acquiring a P-code signal from a satellite based on the acquisition assistance data without first acquiring a C-code signal from the satellite.

33. The method of claim 32, wherein the acquisition assistance data includes time-of-week data indicating an initial time offset into the P-code signal.

34. The method of claim 33, further comprising locally generating a reference pseudorandom code sequence based on the time-of-week data received from the assist server.

35. The method of claim 34, wherein directly acquiring the P-code signal comprises correlating the P-code signal with the locally generated reference code sequence according to the time-of-week data.

36. A system comprising:
an assist server to track a signal from a Global Positioning System (GPS) satellite and generate acquisition assistance information from the signal; and
a mobile unit to receive the acquisition assistance data from the assist server, and to acquire a P-code signal from the satellite based on the acquisition assistance data.

37. The system of claim 36, wherein the acquisition assistance data includes time-of-week data for the satellite indicating an initial time offset into a P-code pseudorandom code sequence.

38. The system of claim 37, wherein the mobile unit comprises a reference generator to locally generate a reference pseudorandom code sequence based on the time-of-week data.

39. The system of claim 38, wherein the mobile unit correlates the signal and the reference pseudorandom code sequence based on the acquisition assistance data to determine an actual time offset for the signal relative to the code sequence.

40. The system of claim 39, wherein the mobile unit stores a time uncertainty value associated with the time-of-week information, and correlates the signal and the reference pseudorandom code according to the time uncertainty value.

41. The system of claim 36, wherein the assist server is coupled to a base station for a cellular communication system.

42. The system of claim 36, wherein the assist server tracks a C/A-code signal and generates the assistance information from the C/A-code signal.

43. The system of claim 36, wherein the assist server tracks a P-code signal and generates the assistance information from the P-code signal.

44. An apparatus comprising:
an antenna to receive a signal from a satellite;
a wireless modem to receive acquisition assistance data from an assist server;
a reference generator to generate a reference pseudorandom code sequence based on the acquisition assistance data; and
a processor to determine a time offset for a P-code pseudorandom code sequence associated with the signal based on the acquisition assistance data.

45. The apparatus of claim 44, wherein the processor determines a position for a mobile unit based on the time offset.

46. The apparatus of claim 44, wherein the acquisition assistance data includes time-of-week data indicating an initial time offset into the P-code sequence.

47. The apparatus of claim 44, further comprising:
an analog-to-digital converter to produce a stream of digital data from the GPS signal; and
a medium to buffer an amount of the digital data.

48. The apparatus of claim 47, wherein the processor sets the amount of buffered digital data based on a time uncertainty value associated with the time-of-week information received from the assist server.

49. The apparatus of claim 47, wherein the processor correlates the buffered digital data with the locally generated reference code sequence to determine a correlation peak for the signal.

50. The apparatus of claim 47, wherein the processor synchronizes the digital data and the reference pseudorandom code sequence.

51. The apparatus of claim 50, wherein the processor synchronizes the digital data and the reference pseudorandom code by estimating a first bit edge within the digital data stored within memory, and disregarding a number of chips within the digital data and a number of chips within the reference pseudorandom code sequence based on the estimated first bit edge and a time uncertainty value associated with the time-of-week information received from the assist server.

52. The apparatus of claim 47, wherein the processor divides the reference code sequence and digital data into blocks of size N, where the block size N is less than a data bit period M associated with the signal plus a time uncertainty value associated with the received time-of-week information, and correlates the buffered digital data with the locally generated reference code sequence to determine a correlation peak.

53. The apparatus of claim 52, wherein the processor forms blocks from the reference code sequence to have M chips and N–M padded zeros.

54. The apparatus of claim 52, wherein the processor slides the reference code relative to the digital data of the signal by N–M chips, where N represents the block size and M represents the bit period, when the correlation peak is below a peak threshold; and repeating the matched filter operations.

55. The apparatus of claim 54, wherein the processor repeatedly sliding the reference code and performing the correlation process until a total number of shifted chips for the reference code exceed a time uncertainty value associated with the time-of-week information received from the assist server.

56. The apparatus of claim 44, wherein the processor performs a Doppler search over a number of Doppler hypotheses to identify a Doppler offset for the signal, and uses the Doppler offset as an initial frequency offset for acquiring signals from subsequent satellites.

57. The apparatus of claim 56, wherein the processor performs the Doppler search for each of a set of Doppler bins using a first integration time to produce a set of outputs, and increases the integration time and repeats the process when no valid peak is detected based on the set of outputs.

58. The apparatus of claim 57, wherein the processor declares a preliminary detection when any of the outputs exceed a detection threshold, stores a current Doppler offset associated with the preliminary detection, and validates the preliminary detection by examining outputs for neighboring Doppler offsets.

59. The apparatus of claim 44, wherein the acquisition assistance data comprises identification for satellites in view from a mobile unit, time-of-week data for the satellites Doppler information for the satellites, frequency synchronization information, and position information for the satellites.

60. The apparatus of claim 44, wherein the processor comprises a digital signal processor (DSP).

61. A computer-readable medium comprising instructions for causing a programmable processor to:
receive acquisition assistance data from an assist server; and
determine a time offset for a P-code pseudorandom code sequence associated with a signal from a satellite based on the acquisition assistance data.

62. The computer-readable medium of claim 61, wherein the instructions cause the processor to determine a position for a mobile unit based on the time offset.

63. The computer-readable medium of claim 61, wherein the acquisition assistance data includes time-of-week data indicating an initial time offset into the P-code sequence.

64. The computer-readable medium of claim 63, wherein the instructions cause the processor to locally generating a reference pseudorandom code sequence based on time-of-week data received from the assist server.

65. The computer-readable medium of claim 63, wherein the instructions cause the processor to set an amount of buffered digital data representing the signal based on a time uncertainty value associated with the time-of-week information received from the assist server.

66. The computer-readable medium of claim 64, wherein the instructions cause the processor to:
estimate a first bit edge within the digital data stored within memory; and
disregard a number of chips within the digital data and a number of chips within the reference pseudorandom code sequence based on the estimated first bit edge and a time uncertainty value associated with the time-of-week information received from the assist server.

67. The computer-readable medium of claim 64, wherein the instructions cause the processor to divide the reference code sequence and digital data into blocks of size N, where the block size N is less than a data bit period M associated with the signal plus a time uncertainty value associated with the received time-of-week information, and to correlate the buffered digital data with the locally generated reference code sequence to determine a correlation peak.

68. The computer-readable medium of claim 67, the instructions cause the processor to form blocks from the reference code sequence to have M chips and N–M padded zeros.

69. The computer-readable medium of claim 67, the instructions cause the processor to slide the reference code relative to the digital data of the signal by N–M chips, where N represents the block size and M represents the bit period, when the correlation peak is below a peak threshold; and repeat the matched filter operations.

70. The computer-readable medium of claim 69, the instructions cause the processor to repeatedly slide the reference code and performing the correlation process until a total number of shifted chips for the reference code exceed a time uncertainty value associated with the time-of-week information received from the assist server.

71. A method comprising:
receiving acquisition assistance data from an assist server;
directly acquiring a P-code signal from a satellite based on the acquisition assistance data without first acquiring a C-code signal from the satellite; and
determining a time offset for a P-code pseudorandom code sequence associated with said P-code signal.

* * * * *